(12) United States Patent
Verma et al.

(10) Patent No.: US 11,360,579 B2
(45) Date of Patent: Jun. 14, 2022

(54) CAPTURING PEN INPUT BY A PEN-AWARE SHELL

(71) Applicant: Microsoft Technology Licensing, LLC, Redmond, WA (US)

(72) Inventors: Arunabh P. Verma, Seattle, WA (US); Sophie A. Beland, Seattle, WA (US); Oluwadara Oke, Seattle, WA (US); William M. Geraci, II, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/853,697

(22) Filed: Apr. 20, 2020

(65) Prior Publication Data

US 2020/0249776 A1 Aug. 6, 2020

Related U.S. Application Data

(63) Continuation of application No. 16/289,648, filed on Feb. 28, 2019, now Pat. No. 10,627,924, which is a
(Continued)

(51) Int. Cl.
*G06F 3/0354* (2013.01)
*G06F 3/04817* (2022.01)
(Continued)

(52) U.S. Cl.
CPC ........ *G06F 3/03545* (2013.01); *G06F 3/0482* (2013.01); *G06F 3/04817* (2013.01);
(Continued)

(58) Field of Classification Search
CPC .................................................. G06F 3/03545
See application file for complete search history.

(56) References Cited

U.S. PATENT DOCUMENTS

2008/0292195 A1 11/2008 Vijayasenan et al.
2015/0253877 A1\* 9/2015 Roper ................ G06F 3/038
345/179

FOREIGN PATENT DOCUMENTS

EP 1947562 A2 7/2008
KR 20160039336 A 4/2016
WO 2015175590 A1 11/2015

OTHER PUBLICATIONS

"Office Action Issued in European Patent Application No. 18709435.4", dated Apr. 7, 2021, 7 Pages.
(Continued)

*Primary Examiner* — Gustavo Polo

(57) ABSTRACT

The electronic devices described herein are configured to enhance user experience associated with using a pen on the touchscreens of the electronic devices. Contact of a pen on the touch screen is detected by a persistent, pen-aware shell that occupies some or all of the touch screen user interface throughout operation of the electronic device. Detected pen contact with the touch screen is captured/collected as pen input and used to perform a function of the electronic device or shared with an application such that the application may perform a function based on the pen input. A performed function or application with which to share the pen in put is selected by a user, automatically by an operating system, or a combination of the two. Automatic capture of pen input by the persistent, pen-aware shell provides an intuitive way of making use of pen/touch screen capability of an electronic device.

20 Claims, 7 Drawing Sheets

Related U.S. Application Data continuation of application No. 15/415,862, filed on Jan. 25, 2017, now Pat. No. 10,254,858.

(51) Int. Cl.
*G06F 3/0482* (2013.01)
*G06F 3/04845* (2022.01)
*G06F 3/04883* (2022.01)
*G06F 40/171* (2020.01)

(52) U.S. Cl.
CPC ...... *G06F 3/04845* (2013.01); *G06F 3/04883* (2013.01); *G06F 40/171* (2020.01); *G06F 2203/04803* (2013.01)

(56) References Cited

OTHER PUBLICATIONS

"Office Action Issued in Indian Patent Application No. 201947029704", dated Sep. 9, 2021, 5 Pages.

\* cited by examiner

CAPTURING PEN INPUT BY A PEN-AWARE SHELL

PRIORITY INFORMATION

This application is a continuation application of and claims priority to U.S. patent application Ser. No. 16/289,648, entitled "CAPTURING PEN INPUT BY A PEN-AWARE SHELL," filed on Feb. 28, 2019, which is a continuation application of and claims priority to U.S. patent application Ser. No. 15/415,862, entitled "CAPTURING PEN INPUT BY A PEN-AWARE SHELL," filed on Jan. 25, 2017, the disclosures of which are incorporated herein by reference in their entireties.

BACKGROUND

Electronic devices, such as personal computers, laptops, mobile phones, and the like are increasingly equipped with touch screens or similar interfaces that enable a user to provide input by writing or drawing with a stylus, pen, or other pen-like device. For instance, tablet computers, which include touch screens as the primary user interface, have become popular alternatives to conventional laptops with keyboards, mice, etc. The ability to draw or write by hand on the touch screen offers substantial flexibility regarding possible inputs. However, user interfaces of many modern applications do not easily accommodate writing and drawing during normal use.

Use of a pen or pen-like device typically requires a step to activate pen input capture software/technology, such as pushing or toggling a button, selecting a pen input mode, activating a pen-compatible application, etc. This preliminary step makes use of a pen with an electronic device unintuitive and less accessible than, for instance, writing on paper with a pen. Applications may require a user to select a particular button in order to activate a pen-compatible mode, or may simply not support pen input in a useful way. Additionally, a touch screen user interface that displays a desktop or default interface without any active pen-compatible applications may not include a capability to handle pen input. With existing systems, the user experience can be clunky or unpleasant when attempting to quickly use the pen/touch screen capability.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computerized method comprises executing a persistent shell across a background of a desktop, upon detecting when a pen touches the background, capturing, by the persistent shell, input from the pen, converting the captured input to an ink data structure, and sharing the ink data structure with an application or automatically performing a function based on the ink data structure.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 7, the systems are illustrated as schematic drawings. The drawings may not be to scale.

DETAILED DESCRIPTION

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices described below are configured to enhance user experience associated with using a pen on the touchscreens of the electronic devices. Contact of a pen on the touch screen is detected by a persistent, pen-aware shell that occupies some or all of the touch screen user interface throughout operation of the electronic device. Detected pen contact on the touch screen is captured/collected as pen input and used to perform a function of the electronic device or shared with an application such that the application may perform a function based on the pen input. A function to be performed or an application with which to share the pen input is selected by a user, automatically by an operating system, or a combination of the two. Automatic capture of pen input by the persistent, pen-aware shell provides an intuitive way of using the pen/touch screen capability of an electronic device. The disclosure provides a smooth and simple user experience incorporating use of a pen or pen-like device on touch screen enabled devices.

Figure 1:
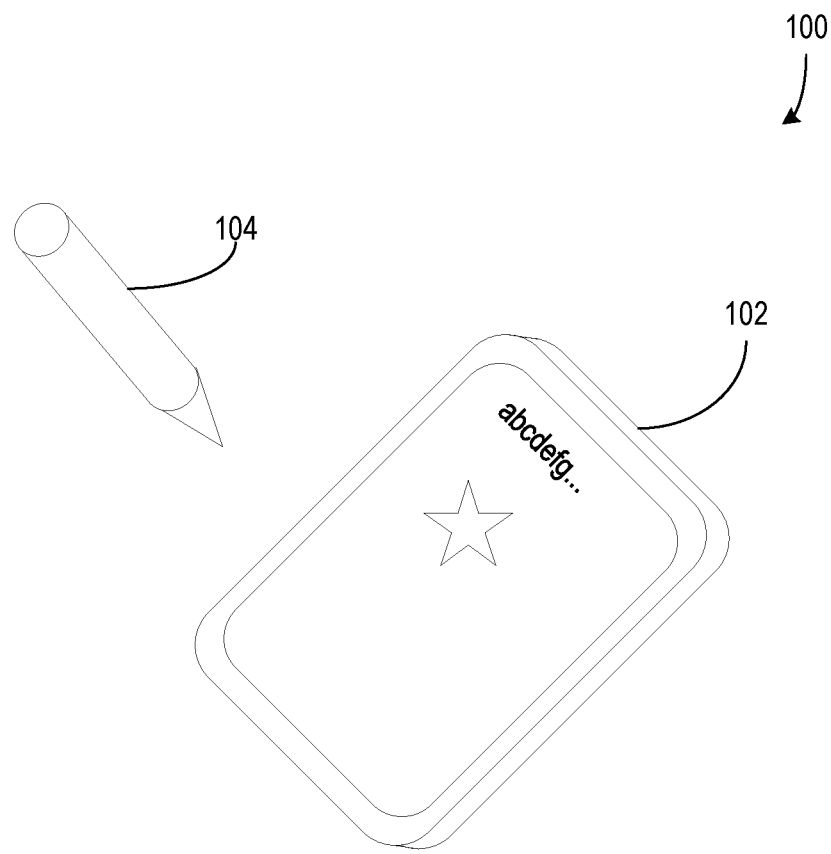
FIG. 1 illustrates a system including an electronic device and an associated pen according to an embodiment.

FIG. 1 illustrates a system 100 including an electronic device 102 and an associated pen 104 according to an embodiment. The electronic device 102 and pen (or pen device) 104 may be associated or linked such that the electronic device 102 and the pen 104 respond to each other. In an example, the pen 104 may be uniquely associated with the electronic device 102 such that other pens and/or similar devices do not interact or interact differently with the electronic device 102.

The electronic device 102 includes a screen interface. The screen interface may receive input via touch sensor(s), pressure sensor(s), capacitance-based sensor(s), or the like. The input may be in the form of shapes, expressions, symbols, handwriting, etc. In an example, the pen 104 may be used to touch, contact, depress, or otherwise interact with the screen interface in order to provide input to the electronic device 102.

The pen 104 may comprise electronic components that enable the pen 104 to interact with the electronic device 102, a user of the pen 104, other electronic devices, etc. For instance, the pen 104 may include a wireless communication interface that enables the pen 104 to communicate wirelessly (via WiFi, cellular, BLUETOOTH, other radio frequency communications, etc.) with the electronic device 102, even when the pen 104 is not in contact with the electronic device 102. Further, the pen 104 may include buttons, switches, and/or other input interfaces which a user of the pen 104 may use to interact with the pen 104 and/or electronic components of the pen 104. Additionally, or alternatively, the pen 104 may include pressure sensors, motion sensors, accelerometers, gyroscopic sensors, or the like that enable the detection of motion, direction, angle, gestures, etc. of the pen 104.

In some examples, the electronic device 102 detects a proximity of the pen 104 to the electronic device 102. The pen 104 emits, transmits, or otherwise sends a signal wirelessly that may be received and interpreted by the electronic device 102 to determine a proximity of the pen 104 relative to the electronic device 102. For instance, the detection of pen proximity to the electronic device 102 may include interpreting a signal strength of a wireless signal from the pen 104 as an indicator of pen proximity. The signal strength of the wireless signal may be strong when the pen 104 is close to the electronic device 102 and the signal strength of the wireless signal may become weaker as the pen 104 moves away from the electronic device 102. Alternatively, or additionally, the pen may transmit, to the electronic device 102, information describing pen motion, pen direction, pen angle, etc. that may be used by the electronic device 102 to further determine a location and/or proximity of the pen 104 relative to the electronic device 102.

In an example, the electronic device 102 detects a proximity of the pen 104 by, at least in part, detecting a signal strength of the wireless signal from the pen 104. A pen proximity threshold is defined to include a signal strength threshold such that, when the signal strength threshold is crossed, the electronic device 102 determines that the pen 104 is within the pen proximity threshold.

Figure 2:
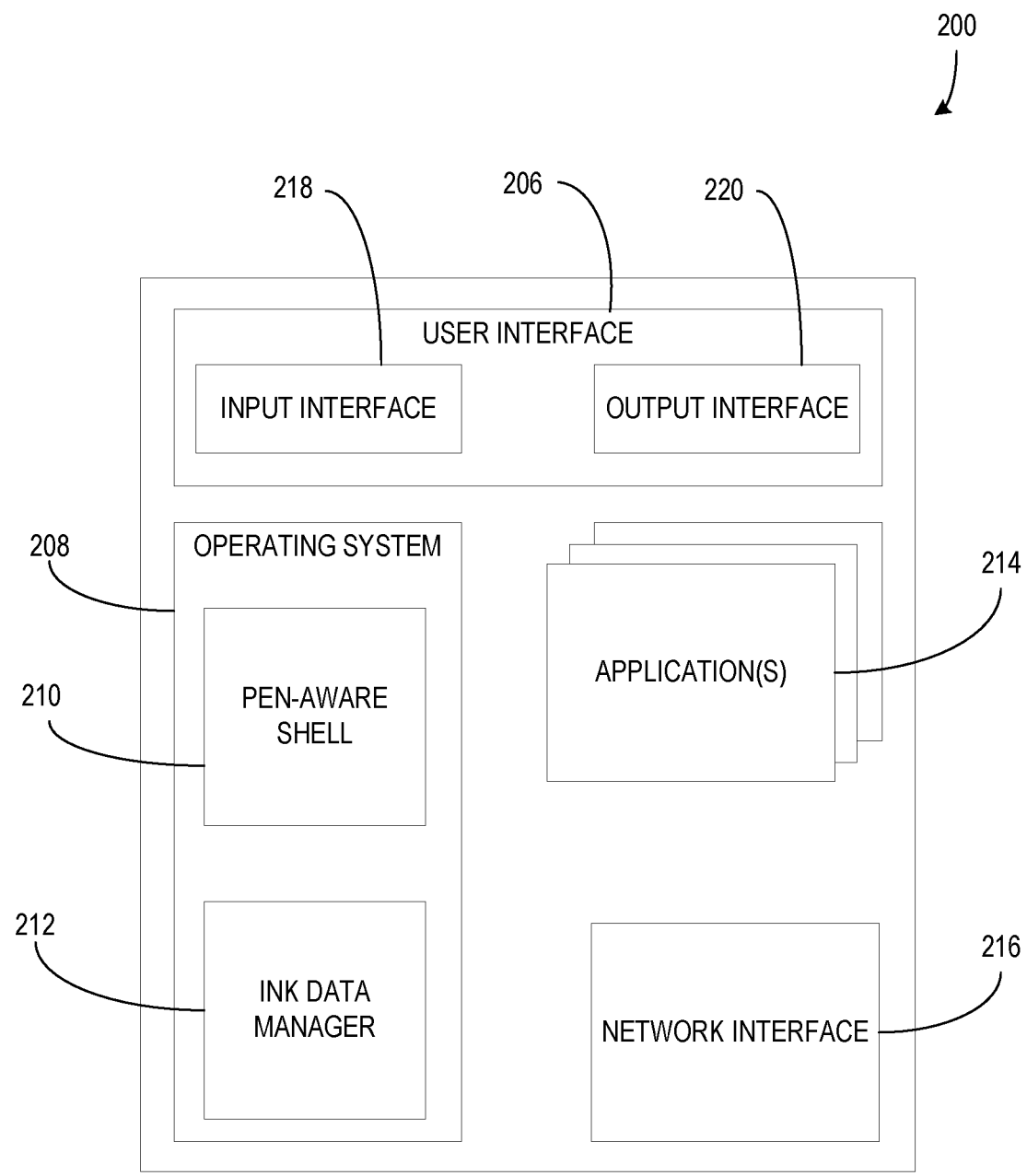
FIG. 2 illustrates a block diagram of an electronic device including a pen-aware shell and an ink data manager according to an embodiment.

FIG. 2 illustrates a block diagram of an electronic device 202 including a persistent, pen-aware shell 210 and an ink data manager 212 according to an embodiment. The electronic device 202 comprises a user interface 206, an operating system 208 including a pen-aware shell 210 and an ink data manager 212, application(s) 214, and a network interface 216. The user interface 206 comprises an input interface 218 and an output interface 220.

In an example, the user interface 206 includes a touch screen. The input interface 206 includes a layer or portion of the touch screen that detects the location of contact, depression, or the like on the touch screen. Contact on the touch screen, whether by a user's finger, pen, stylus, or the like, is detected by the input interface 218 and interpreted as input to the user interface 206. The output interface 220 includes a layer or portion of the touch screen that displays, renders, or otherwise outputs information to a user of the electronic device 202. The output interface 220 may display colors, shapes, letters, or the like to communicate output information to a user of the electronic device.

Alternatively, or additionally, the input interface 218 may receive input from a pen device (e.g., pen 104, etc.) linked to the electronic device 202 as described above with respect to FIG. 1. The pen device and electronic device 202 may be in communication via the network interface 216 of the electronic device 202.

The input interface 218 may include other interfaces, such as keyboards, mice, switches, buttons, microphones, cameras, motion detection, etc. These components of the input interface 218 further enable a user to input information into the electronic device 202. For instance, a camera associated with the input interface 218 may detect a user's gestures and interpret the gestures as a form of input information. For example, the camera and input interface 218 may be associated with an augmented reality device and/or a virtual reality device.

The output interface 220 may further include speakers, vibration components, projector components, etc. These components of the output interface 220 further enable the electronic device 202 to communicate output information to a user. For instance, a vibration component of the output interface 220 may vibrate to provide a notification to the user of the electronic device 202.

The operating system 208 is a software component configured to perform core software operations of the electronic device 202 and to provide a platform upon which other software components (e.g., application(s) 214, etc.) are executed. It should be understood that the operating system 208 functions according to typical methods as understood by a person of ordinary skill in the art of computer science, computer engineering, or the like. Further, the operating system 208 includes a pen-aware shell 210 and an ink data manager 212.

The pen-aware shell 210 comprises software that may interact with the user interface 206, including receiving pen input data associated with a pen device (e.g., pen 104, etc.) or other objects contacting the user interface 206. The pen-aware shell 210 may monitor the input interface 218, or a portion of the input interface 218, for contact by a pen device or other object. Upon detecting contact by a pen device, the pen-aware shell 210 collects pen input in the form of movement of the contact point of the pen device due to writing or drawing, detecting multiple contacts due to picking up the pen and placing it back down during writing or drawing, or the like. The pen-aware shell 210 may further determine when collected pen input is complete and transfer the collected pen input to the ink data manager 212.

In an example, the pen-aware shell is persistently active throughout the operation of the electronic device. Alternatively, the pen-aware shell may become active based on detected approach and/or proximity of a pen device (e.g., pen 104, etc.) to the electronic device.

The pen-aware shell, in some examples, is a user-level application associated with the operating system, and is not a third-party application.

The ink data manager 212 is a software component associated with the operating system 208 that may receive pen input from the pen-aware shell 210, convert the pen input to an ink data structure, select an application as a destination for the ink data structure, and send the ink data structure to the selected application. In an example, sending the ink data structure to a selected application may include triggering a pen event to be sent to the selected application. Alternatively, or additionally, the ink data manager 212 may determine a function to perform based on the ink data structure. In some examples, the ink data manager 212 may be a part of or otherwise closely associated with the pen-aware shell 210.

In an example, an ink data structure may include a data representation of drawn lines, dots, symbols, letters, expressions, or the like. The representation may be in the form of vector graphics, bitmap, other image representation, etc. and may include raw ink data, associated transcribed text, if any, an action to be executed by a target application, if any, an event to be performed by the pen-aware shell, if any, a timestamp of when the ink was drawn, etc.

The pen-aware shell 210 in combination with the ink data manager 212 provides a user access to services of the operating system by writing on the user interface with the pen device. For instance, the pen-aware shell 210 and ink data manager 212 may enable a user to execute function commands by writing the commands on the pen-aware shell 210 of the user interface 206. Further, application(s) 214 may be executed by writing a name, code, or command associated with an application. Drawn patterns or written words and/or phrases may be interpreted to be associated with functions and/or applications, such that writing or drawing them on the pen-aware shell 210 may cause the function to be executed, or the application to be run, activated, or the like.

The application(s) 214 are software components that are installed on the electronic device 202. In an example, an application 214 uses the operating system 208 as a platform for executing instructions and/or providing functionality to a user of the electronic device 202. For instance, an application 214 may be a word processing application, an email application, a web browser, a messaging application, a game, or the like. It should be understood that the application(s) 214 may be of any application type known to a person of ordinary skill in the art without departing from the scope of the description herein.

In an example, an application 214 includes a pen event handler component that is configured to receive, detect, and/or react to pen events (e.g., receiving an ink data structure from the ink data manager 212, etc.) that are triggered by the operating system. The pen event handler of the application 214 may cause the activation of pen-compatible controls, redrawing of the user interface, performance of functions based on received ink data structures, etc.

In an example, an application 214 lacks the capability to interpret an ink data structure as sent by the ink data manager 212. In that case, the ink data manager 212 may further convert the ink data structure into a format that is compatible with the application 214. The application 214 may include one or more application program interfaces (APIs) to be used by the ink data manager 212 to determine a compatible format for the ink data structure. The APIs are called and/or activated by the ink data manager 212 to share an ink data structure in a compatible format with the application 214.

Alternatively, an application 214 may be configured to include functionality to handle incoming ink data structures. The application 214 may include one or more APIs that receive ink data structures as input and the ink data manager 212 may call the APIs in order to provide ink data structures to the application 214. In an example, a map application includes one or more default functions that are performed based on received ink data structures. For instance, the map application may attempt to interpret an ink data structure as an address, cross streets, a request for directions, or the like based on interpretation of the ink data structure.

In an example, the pen-aware shell 210 occupies the entire screen of the user interface 206 and no active application(s) 214 are displayed. For instance, only a graphical "desktop" is displayed. The pen-aware shell 210 detects writing and/or drawing as pen input on any portion of the user interface 210 and causes, as a result of detected writing and/or drawing, a function to be performed and/or an application to be run or activated.

In an alternative example, the user interface 206 displays an active, pen-aware, or pen-compatible, application capable of handling pen input on a portion of a screen. The pen-aware shell 210 occupies the remainder of the screen not covered by the pen-aware application, because the pen-aware application is considered to overlap, or cover, the pen-aware shell 210. Writing and/or drawing on the portion of the screen occupied by the pen-aware application is handled by the pen-aware application and not the pen-aware shell 210. However, writing and/or drawing on the portion of the screen not occupied by the pen-aware application is handled by the pen-aware shell 210 and not the pen-aware application. Further, the pen-aware application may be only partially pen-aware, such that a portion of the user interface 206 occupied by the application may not be pen-aware. In that case, the pen-aware shell 210 may handle writing and/or drawing on the portion of the application that is not pen-aware, or not.

In a further example, the user interface 206 displays an active application that is not capable of handling pen input on a portion of a screen. The pen-aware shell 210 occupies the entire screen, including the portion of the screen covered by the active application. Because the application cannot handle pen input, the pen-aware shell 210 may handle writing and/or drawing on the portion of the screen occupied by the active application. Further, the ink data manager 212 may convert or otherwise transform ink data structures from pen input in the portion occupied by the application into a format that is compatible with the application. The converted ink data structures may be provided to the application in the compatible format for use by the application.

The network interface 216 provides an interface by which the electronic device 202 may communicate with other electronic devices, computing devices, access points, or the like. The network interface 216 may provide access to one or more channels of network communication, including wired network connections, wireless network connections, etc. In some examples, components described as being part of the electronic device 202 may instead be located outside of the electronic device 202 and accessed by the electronic device via the network interface 216.

In an example, the electronic device comprises a user interface, at least one processor, and at least one memory comprising computer program code. The computer program code is configured to, with the at least one processor, cause the electronic device to at least execute a pen-aware shell that occupies at least a portion of the user interface; upon detecting contact from a pen device on the user interface, capture, by the pen-aware shell, input from the pen device; upon the pen-aware shell determining the capture of the input from the pen device is complete, convert the captured input to an ink data structure; and perform a function based on the ink data structure.

Figure 3:
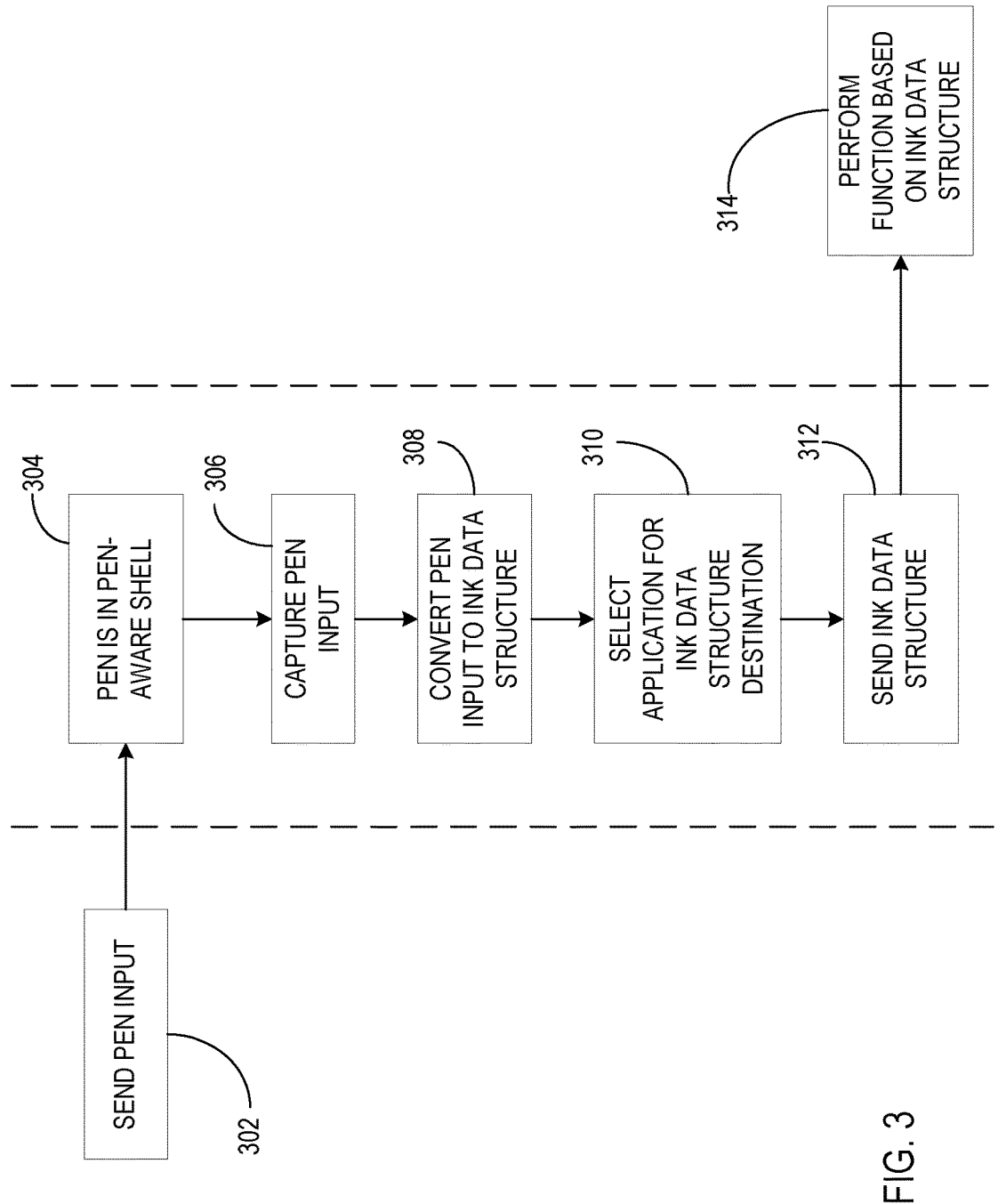
FIG. 3 illustrates a diagram of interactions between pen/device interface, operating system, and application according to an embodiment.

FIG. 3 illustrates a diagram of interactions between a pen/device interface (e.g., user interface 206, etc.), an operating system (e.g., operating system 208, etc.), and an application (e.g., an application 214, etc.) according to an embodiment. The pen/device interface sends pen data to the operating system at 302. At 304, the operating system receives the pen data and determines whether the pen is in an interface portion occupied by the pen-aware shell. If so, at 306, the operating system (e.g., the pen-aware shell 210, etc.) captures the pen input. The pen input is converted to an ink data structure (e.g., by the ink data manager 212, etc.) at 308. At 310, the operating system (e.g., the ink data manager 212, etc.) selects an application for the ink data structure destination. At 312, the operating system sends the ink data structure to, or shares the ink data structure with, the selected application. Upon receiving the ink data structure, the selected application (e.g., an application 214, etc.) performs a function based on the received ink data structure at 314.

The pen input sent by the interface at 302 may include coordinates or similar representation of the location of the pen contact on the interface. The operating system, via a pen-aware shell, receives the location representation and compares it to a portion of the interface occupied by the pen-aware shell. The pen-aware shell may occupy all of the interface, or it may occupy only a portion of the interface as described above. The comparison, at 304, indicates to the operating system whether to continue with the described pen-aware shell input process.

Capturing pen input at 306 may include collecting a data representation of pen contact locations on the user interface as the pen contacts the surface, moves on the surface, temporarily lifts from the surface and re-contacts the surface, etc. The captured pen input may include timing and/or order data describing the order in which portions of the pen input are written and/or drawn.

In an example, the application and/or operating system may identify when pen input is complete in order to determine when to convert the pen input into an ink data structure. For instance, a pause threshold may be defined such that when an active pen input session has been idle for a time period that exceeds the pause threshold, the pen input session is considered complete. The pen input being considered complete may cause the pen-aware shell (e.g., pen-aware shell 210, etc.) to send the collected pen input to the ink data manager (e.g., ink data manager 212, etc.). Alternatively, or additionally, completion of the pen input may be signaled by a user of the pen drawing a defined symbol, pressing a button on the pen or electronic device, double tapping the pen, inverting the pen, or other input method.

When the pen input has been collected, the pen-aware shell sends the pen input to the ink data manager for conversion at 308. The pen input may be converted into an ink data structure which may include a data representation of the drawn lines, dots, symbols, letters, expressions, or the like, of the pen input. The representation may be in the form of vector graphics, bitmap, other image representation, etc.

At 310, the ink data manager selects an application for an ink data structure destination. The application (e.g., an application 214, etc.) may be selected by offering a choice of available, pen-compatible applications to a user of the electronic device for selection. The electronic device may track pen-compatible applications that are installed or otherwise made available on the electronic device such that a list of pen-compatible applications is available for display to the user for the purpose of selecting an ink data structure destination application. The choice of applications may be offered to the user in a list, a window containing icons associated with the applications, etc. The list may be sorted alphabetically, based on frequency of past use of the application, based on relevance to the ink data structure, etc.

In an example, the list of pen-compatible applications includes applications that are capable of handling an ink data structure. Further, the list of pen-compatible applications may include applications that cannot handle an ink data structure, but that can handle data in format to which the ink data manager is capable of converting the ink data structure.

Alternatively, or additionally, a subset of available, pen-compatible applications is provided to a user of the electronic device for selection. In an example, the subset of applications are chosen by the ink data manager based on past frequency of use. If an application is used frequently in conjunction with ink data structures, the application may appear as a first choice, or other high priority choice, in the subset of provided applications. If an application has not been used in conjunction with an ink data structure, or has seldom been chosen for use in conjunction with an ink data structure, the application may appear as a low priority choice, or not appear at all as a choice to the user. A defined number of the highest priority applications may be displayed to the user for selection (e.g., one application, three applications, six applications, etc.). Further, a "more applications" option may be provided, enabling a user to select from lower priority applications that are not initially displayed.

The subset of applications may be chosen based on context of the ink data structure. For instance, if the ink data structure is interpreted as including a date and/or time, the subset of applications may include a calendar application upon which an appointment may be created based on the ink data structure. If the ink data structure is interpreted as including an address, the subset of applications may include a map application with which a user may find directions to the address based on the ink data structure. Further, if the ink data structure includes list of items (e.g., a bulleted list, a numbered list, etc.), the subset of applications may include a note-taking application in which a new note may be created including the list of items based on the ink data structure.

In an example, the subset of applications is chosen based on a location of the interface at which the ink data structure is drawn/written. The ink data manager selects application(s) to provide to a user based on a proximity of the drawn/written ink data structure to an icon associated with the selected application(s). For instance, if the ink data structure is drawn/written close to an icon associated with a messaging application, the subset of applications may include the nearby messaging application such that the text of the ink data structure may be sent as a message.

A user may select a provided application as an ink data structure destination by selecting or otherwise indicating a provided application (e.g., clicking on the application with a mouse, etc.). Alternatively, the user may select a provided application by dragging and dropping the drawn/written ink data structure onto an icon/representation of the application on the provided application list or other region of the interface (e.g., a desktop icon, application window, etc.). For instance, a user writes "lunch?" with a pen on a user interface of an electronic device, and then drags the message onto a contact entry on a contact list of a messaging application. Then, the messaging application sends a message including "lunch?" to the selected contact.

Alternatively, or additionally, selecting an application for an ink data structure destination at 310 may include automatically choosing an application by the ink data manager. The ink data manager may select the application based on a defined priority of applications as described above and/or based on context of the ink data structure as described above. For instance, the ink data structure may be interpreted as including, as context, a keyword or symbol that is associated with a particular application. If the ink data structure starts with the keyword "message", the ink data manager selects a messaging application with which a message associated with the ink data structure may be sent. A symbol, such as a drawn star or the like, may be associated with an application, such as a note-taking application. For instance, when an ink data structure is interpreted to include a star symbol, the ink data manager selects the associated note-taking application with which text of the ink data structure may be saved to a note file.

In an example, automatically selecting, by the ink data manager, an application for an ink data structure destination at 310 includes choosing an application based on a location of the interface at which the ink data structure is drawn/written. The ink data manager selects an application based on a proximity of the drawn/written ink data structure to an icon associated with the selected application. For instance, if the ink data structure is drawn/written close to an icon associated with a messaging application, the ink data manager selects the nearby messaging application as the destination such that the text of the ink data structure may be sent as a message.

In some examples, the operating system (e.g., the ink data manager 212, etc.), may perform a function based on an ink data structure instead of, or in addition to, selecting a destination application. A function to be performed based on an ink data structure may be selected by a user from a provided set of functions, as with application selection described above. Alternatively, or additionally, the operating system may automatically select a function to perform based on pre-defined function definition(s) and/or context of the ink data structure, as described with respect to the automatically selected application(s) above. Selected functions to perform based on the ink data structure may include opening, saving, closing, deleting, moving, copying, or otherwise interacting with a file; shutting down the electronic device or otherwise causing the electronic device to enter a sleep mode; connecting and/or disconnecting to a network; searching for a file; running an Internet search; adjusting a setting of the electronic device; and/or otherwise running a command. In some examples, the operating system may save and/or maintain a history of all entered ink data and associated functions performed based on user preferences, etc.

When an application (e.g., an application 214, etc.) receives an ink data structure, or other format of data based on an ink data structure, the application may perform a function based on the ink data structure at 314. The application may include one or more functions defined to be associated with ink data structures. For instance, a messaging application may include a function of sending a message including text from the received ink data structure. Further, the messaging application may also include a function for adding a contact to a contact list based on the text of the ink data structure when the ink data structure includes a keyword or symbol, such as "add" or a plus sign, for adding a contact.

Figure 4:
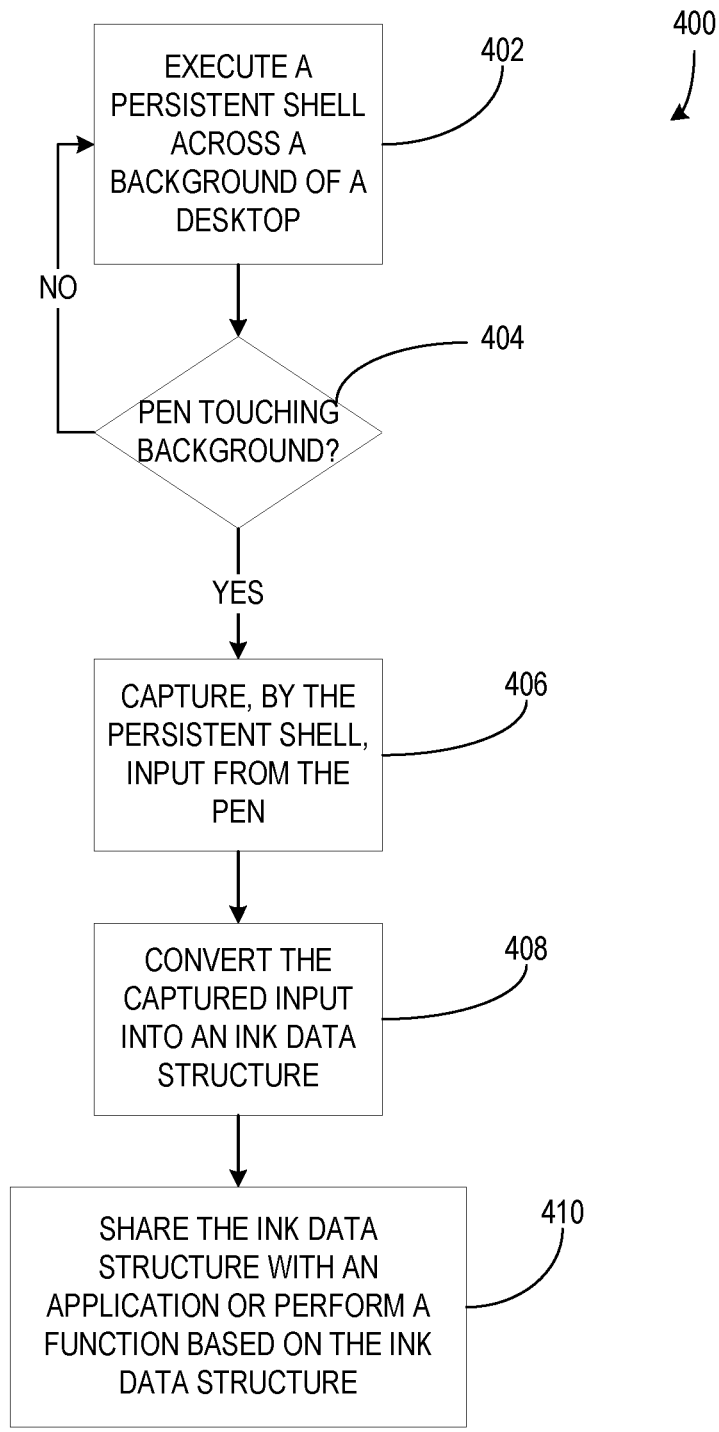
FIG. 4 illustrates a flow chart of a method of receiving pen input by a pen-aware shell, converting pen input into an ink data structure, and managing the ink data structure according to an embodiment.

FIG. 4 illustrates a flow chart of a method 400 of receiving pen input by a pen-aware shell, converting pen input into an ink data structure, and managing the ink data structure according to an embodiment. The method 400 comprises executing, at 402, a persistent shell across a background of a desktop; at 404, upon detecting when a pen touches the background, capturing, by the persistent shell, input from the pen at 406; converting, at 408, the captured input to an ink data structure; and sharing, at 410, the ink data structure with an application or automatically performing a function based on the ink data structure.

In some examples, sharing the ink data structure with an application includes selecting an application with which to share the ink data structure. The application may be selected by user selection from a plurality of provided applications and/or automatically selected based on a context associated with the ink data structure. User selection of an application may include a user dragging the ink data structure and dropping it on an icon associated with the target application.

Further, performing a function based on the ink data structure may include determining a function command based on the ink data structure and executing the determined function command. The function to be performed may include running an application, opening a file, searching a directory, searching using an Internet search engine, or adjusting a setting of the electronic device.

Figure 5:
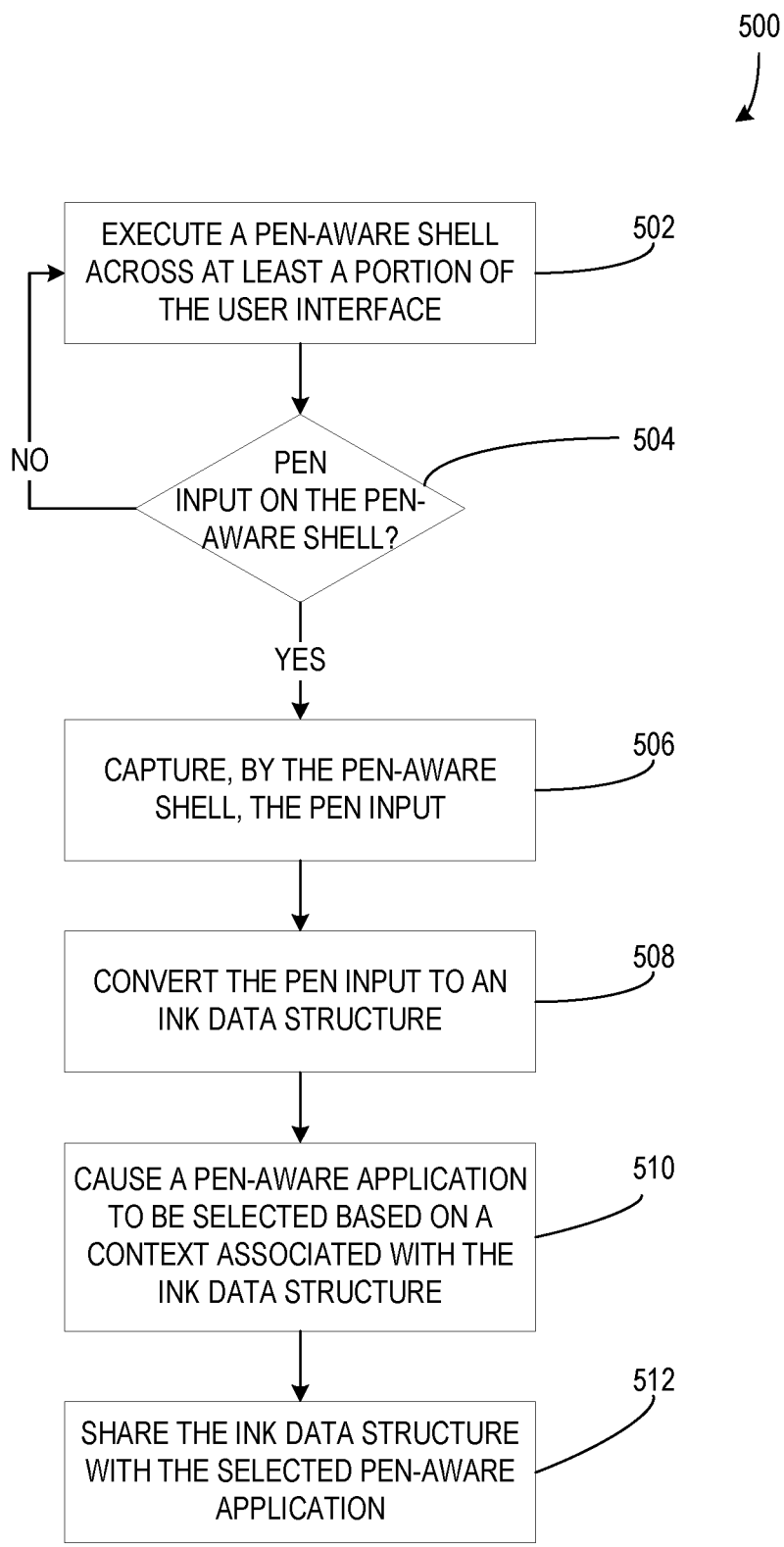
FIG. 5 illustrates a flow chart of a method of capturing pen input by a pen-aware shell, converting the pen input to an ink data structure, causing a pen-aware application to be selected, and sharing the ink data structure with the selected pen-aware application according to an embodiment.

FIG. 5 illustrates a flow chart of a method 500 of capturing pen input by a pen-aware shell, converting the pen input to an ink data structure, causing a pen-aware application to be selected, and sharing the ink data structure with the selected pen-aware application according to an embodiment. The method 500 comprises executing, at 502, a pen-aware shell across at least a portion of the user interface; upon detecting pen input on the pen-aware shell at 504, capturing, by the pen-aware shell, the pen input at 506; converting, at 508, the pen input to an ink data structure; causing, at 510, an application to be selected based on a context associated with the ink data structure; and sharing, at 512, the ink data structure with the selected application.

Causing an application to be selected may further include automatically selecting, by an ink data manager, an application based on a keyword and/or symbol in the ink data structure and/or providing a plurality of applications to a user for user selection.

Figure 6A:
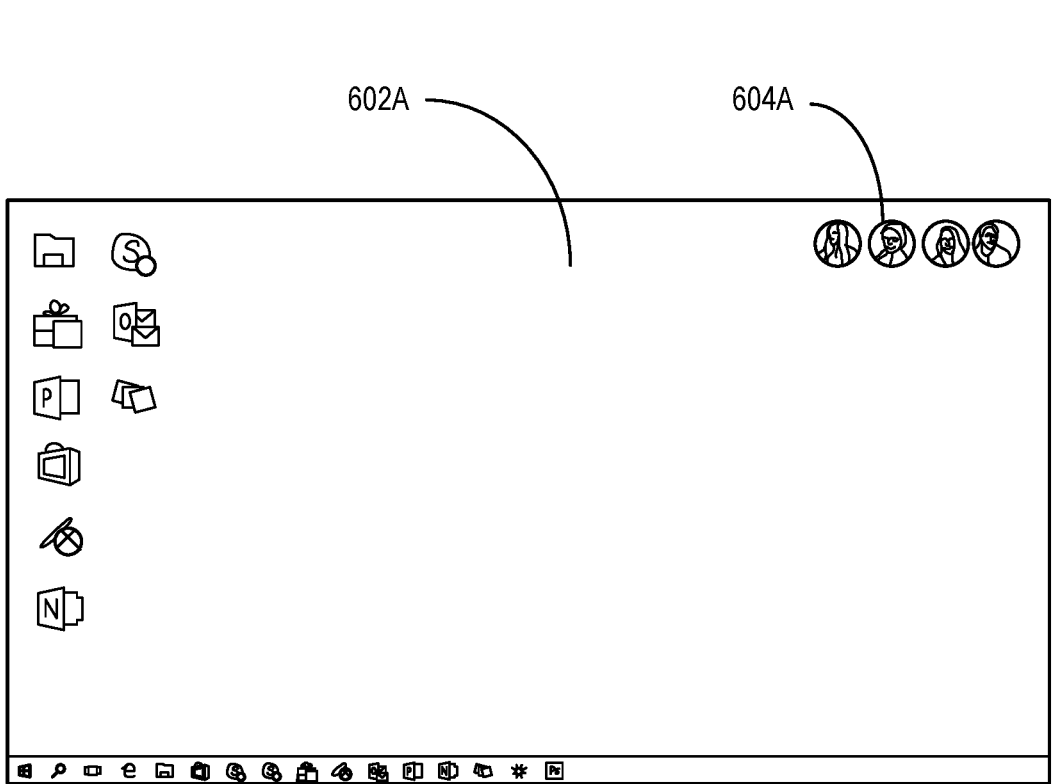
FIGS. 6A-6B illustrate before and after screenshots of pen input being captured by a pen-aware shell according to an embodiment.
Figure 6B:
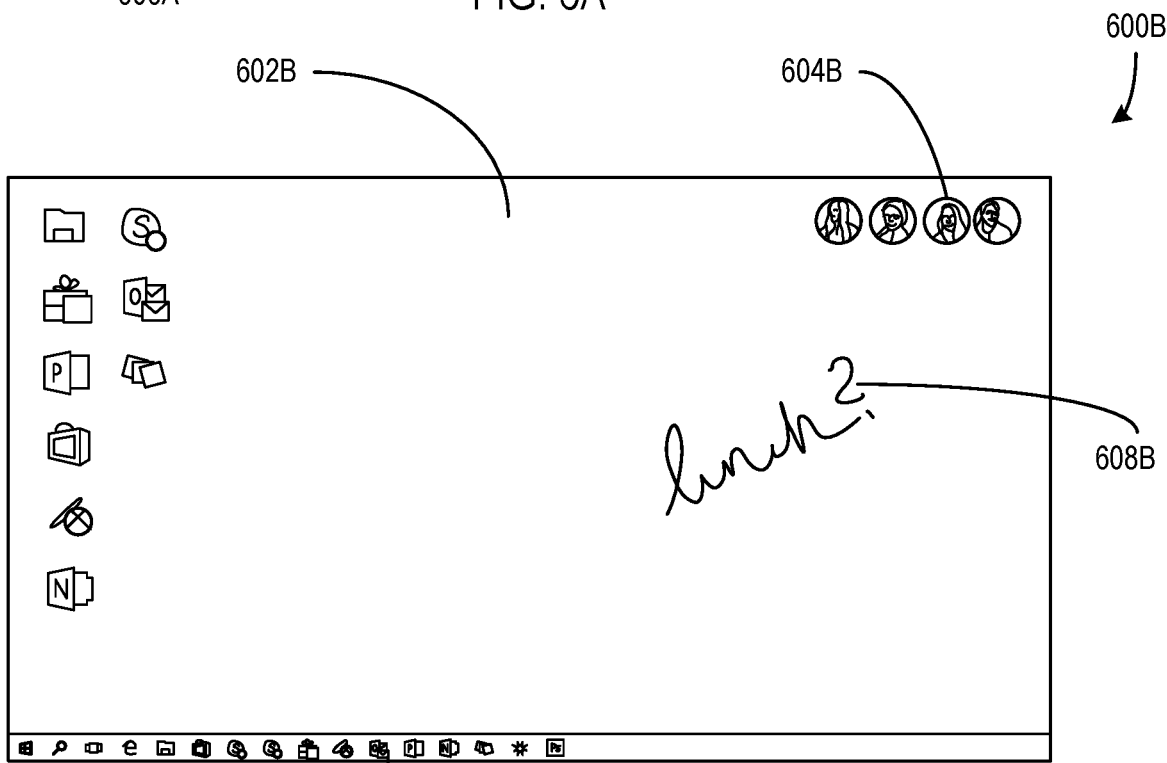

FIGS. 6A-6B illustrate before and after screenshots 600A and 600B of pen input 608B being captured by a pen-aware shell 602A and 602B according to an embodiment. The screenshot 600A illustrates a pen-aware shell 602A of an electronic device as described herein. The illustrated interface further includes contact icons 604A and a task bar 606A. The contact icons 604A show pictures associated with contacts and are associated with one or more methods of communication with the represented contacts. For instance, the icons 604A may be useful communicating with the represented contacts via a messaging application, email application or the like. The task bar 606A shows icons associated with applications that are installed or otherwise present on the electronic device. The applications on the task bar 606A may be currently active, active but in the background, available for execution, or the like. For instance, the task bar 606A may include applications such as internet browsers, email applications, word processing or other office applications, messaging applications, etc. The pen-aware shell 602A occupies the desktop of the interface such that a user may write or draw on the interface and the pen-aware shell 602A may capture the writing or drawing (pen input) as described herein.

The screenshot 600B illustrates a pen-aware shell 602B that has been written on by a pen in the form of pen input 608B. The pen input 608B is displayed on the pen-aware shell 602B in the form of the word "lunch?" in blue ink on the desktop. A contact icon 604B is highlighted, appearing larger and more opaque than the other contact icons. A user drags and drops the pen input 608B to the contact icon 604B, double taps the contact icon 604B, or otherwise selects the contact icon 604B in order to send a message containing the text content of the pen input 608B to the represented contact. Alternatively, an application of the task bar 606B may be selected in association with the pen input 608B. For instance, an email application may be selected such that an email draft is created that includes the text of the pen input 608B in the subject and/or body. In another example, an internet browser application may be selected such that an internet search is run on the text of the pen input 608B and results are displayed in the selected internet browser.

Figure 7:
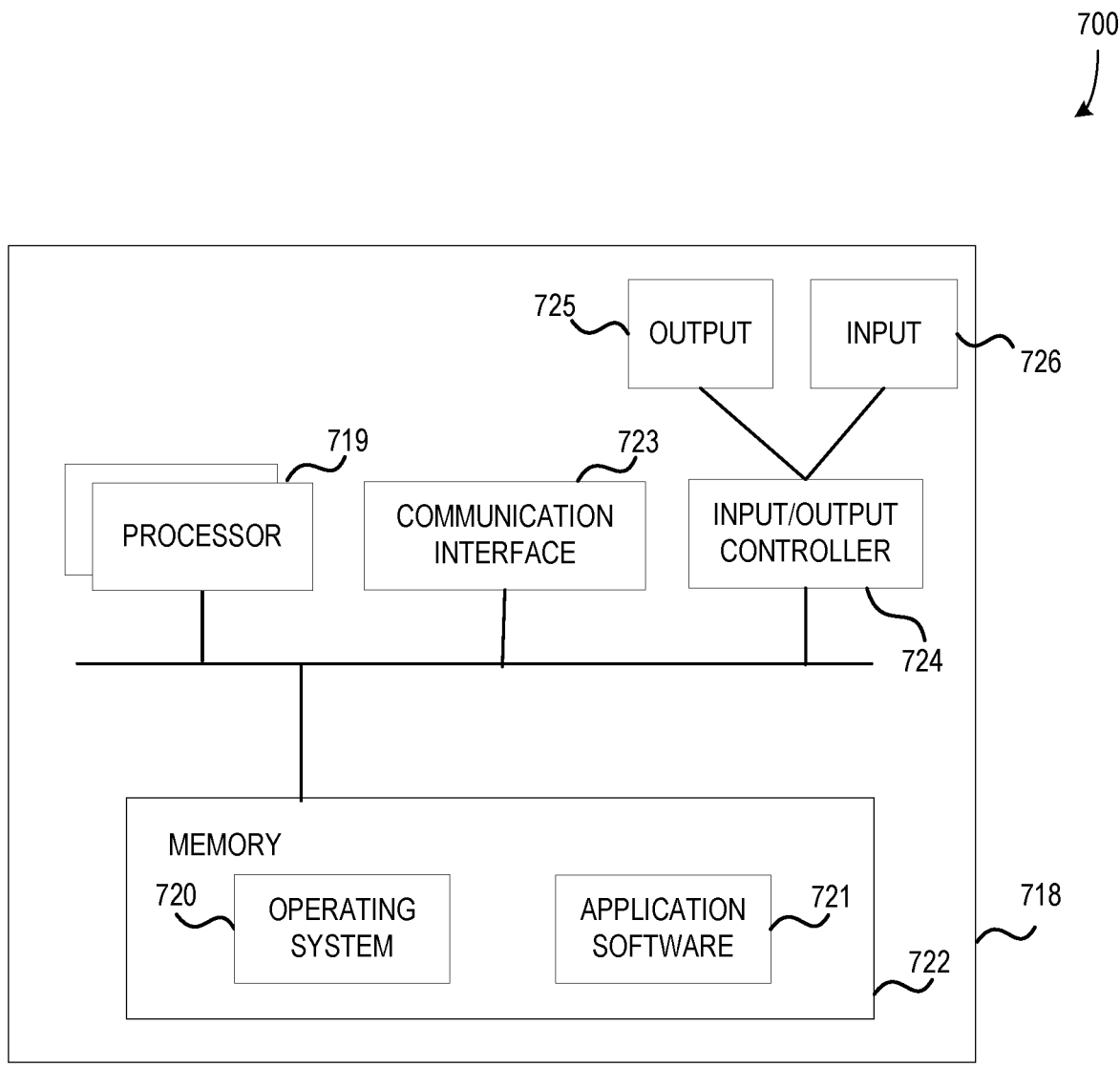
FIG. 7 illustrates a computing apparatus according to an embodiment as a functional block diagram.

FIG. 7 illustrates a computing apparatus 718 according to an embodiment as a functional block diagram. In an embodiment, components of a computing apparatus 718 may be implemented as a part of an electronic device and/or computing device according to one or more embodiments described in this specification. The computing apparatus 718 comprises one or more processors 719 which may be microprocessors, controllers or any other suitable type of processors for processing computer executable instructions to control the operation of the electronic device. Platform software comprising an operating system 720 or any other suitable platform software may be provided on the apparatus 718 to enable application software 721 to be executed on the device. According to an embodiment, executing a pen-aware shell, collecting pen input, converting pen input to an ink data structure, and sharing an ink data structure with an application or performing a function based on an ink data structure may be accomplished by software. Furthermore, it may receive network communications from other computing devices via a network or other type of communication link pertaining to pen input, ink data structures, ink data structure context, or the like.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

Alternatively, or in addition to the other examples described herein, examples include any combination of the following:

An electronic device comprising:
a user interface;
at least one processor; and
at least one memory comprising computer program code, the at least one memory and the computer program code configured to, with the at least one processor, cause the electronic device to at least:
execute a pen-aware shell that occupies at least a portion of the user interface;
upon detecting contact from a pen device on the user interface, capture, by the pen-aware shell, input from the pen device;
upon the pen-aware shell determining the capture of the input from the pen device is complete, convert the captured input to an ink data structure; and
perform a function based on the ink data structure.

The electronic device described above, wherein performing a function based on the ink data structure includes sharing the ink data structure with an application.

The electronic device described above, wherein sharing the ink data structure with an application includes selecting an application with which to share the ink data structure.

The electronic device described above, wherein selecting an application includes selecting an application based on a context associated with the ink data structure.

The electronic device described above, wherein selecting an application includes providing a plurality of applications for user selection.

The electronic device described above, wherein the plurality of applications is based on a defined set of applications.

The electronic device described above, wherein the plurality of applications is based on context associated with the ink data structure.

The electronic device described above, wherein context associated with the ink data structure includes at least one of a keyword or a symbol associated with at least one application.

The electronic device described above, wherein the user interface is partially occupied by a pen-compatible application; and wherein the pen-aware shell occupies a remainder of the user interface not occupied by the application.

The electronic device described above, wherein the user interface is partially occupied by a non-pen-compatible application; and wherein the portion of the user interface occupied by the pen-aware shell includes the non-pen-compatible application.

A method comprising:
executing a persistent shell across a background of a desktop;
upon detecting when a pen touches the background, capturing, by the persistent shell, input from the pen;
converting the captured input to an ink data structure; and
sharing the ink data structure with an application or automatically performing a function based on the ink data structure.

The method described above, wherein performing a function based on the ink data structure includes determining a function command based on the ink data structure; and executing the determined function command.

The method described above, wherein performing a function based on the ink data structure includes at least one of running an application, opening a file, searching a directory, searching using an Internet search engine, or adjusting a setting of the electronic device.

The method described above, wherein sharing the ink data structure with an application includes dragging a representation of the ink data structure onto an icon associated with the application.

The method described above, wherein sharing the ink data structure with an application includes selecting an application with which to share the ink data structure.

The method described above, wherein selecting an application includes selecting an application based on a context associated with the ink data structure.

The method described above, wherein selecting an application includes providing a plurality of applications for user selection.

One or more computer storage media having computer-executable instructions that, upon execution by a processor, cause the processor to at least:
execute a pen-aware shell across at least a portion of the user interface;
upon detecting pen input on the pen-aware shell, capture, by the pen-aware shell, the pen input;
convert the pen input to an ink data structure;
cause an application to be selected; and
share the ink data structure with the selected application.

The one or more computer storage media described above, wherein causing an application to be selected includes selecting an application based on a context associated with the ink data structure.

The one or more computer storage media described above, wherein causing an application to be selected includes providing a plurality of applications for user selection.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for capturing pen input on a persistent, pen-aware shell and handling the pen input by sharing it with an application or performing a function based on the pen input. The illustrated one or more processors 719 together with the computer program code stored in memory 722 constitute exemplary processing means for capturing pen input, means for converting pen input to ink data structures, means for sharing ink data structures with applications, and means for performing functions based on ink data structures.

The term "comprising" is used in this specification to mean including the feature(s) or act(s) followed thereafter, without excluding the presence of one or more additional features or acts.

The invention claimed is:

1. An electronic device comprising:
a user interface;
at least one processor; and
at least one memory comprising computer program code, the at least one memory and the computer program code configured to, with the at least one processor, cause the electronic device to at least:
detect a proximity of a pen to the electronic device;
based on the detected proximity, execute a pen-aware shell on the user interface;
collect, by the pen-aware shell, pen input on a portion of the user interface occupied by the pen-aware shell;
convert, by an ink data manager, the pen input into an ink data structure;
identify an application as a destination for the ink data structure; and
share the converted pen input with the application.

2. The electronic device of claim 1, wherein the computer program code is further configured to activate pen-compatible controls based on the pen input.

3. The electronic device of claim 1, wherein the computer program code is further configured to, with the at least one processor, cause the electronic device to at least:

limit the pen input collection of the pen-aware shell to portions of the user interface lacking an executing pen-aware application.

4. The electronic device of claim 3, wherein the pen-aware shell occupies a portion of the user interface occupied by the pen-aware application.

5. The electronic device of claim 1, wherein a portion of the user interface upon which the pen-aware shell collects pen input is inversely contingent on portions of the user interface upon which one or more pen-aware applications collect pen input.

6. The electronic device of claim 5, wherein the pen-aware shell occupies a portion of the user interface occupied by a pen-aware application.

7. The electronic device of claim 1, wherein the application is executing on a portion of the user interface that the pen input is collected at the time the pen input is collected.

8. The electronic device of claim 1, wherein the application is not executing on a portion of the user interface that the pen input is collected at the time the pen input is collected.

9. The electronic device of claim 1, wherein the collected pen input is a drawing, text, or both.

10. A method comprising:
    detect a proximity of a pen to an electronic device;
    based on the detected proximity, executing a pen-aware shell on a user interface;
    collecting, by the pen-aware shell, pen input on a portion of the user interface occupied by the pen-aware shell
    convert the pen input into an ink data structure;
    identifying an application as a destination for the ink data structure; and
    sharing the converted pen input with the application.

11. The method of claim 10, further comprising activating pen-compatible controls based on the pen input.

12. The method of claim 10, further comprising limiting the pen input collection of the pen-aware shell to portions of the user interface lacking an executing pen-aware application.

13. The method of claim 12, wherein the pen-aware shell occupies a portion of the user interface occupied by the pen-aware application.

14. The method of claim 10, wherein a portion of the user interface upon which the pen-aware shell collects pen input is inversely contingent on portions of the user interface upon which one or more pen-aware applications collect pen input.

15. The method of claim 14, wherein the pen-aware shell occupies a portion of the user interface occupied by the pen-aware application.

16. The method of claim 10, wherein the application is executing on a portion of the user interface that the pen input is collected at the time the pen input is collected.

17. The method of claim 10, wherein the application is not executing on a portion of the user interface that the pen input is collected at the time the pen input is collected.

18. The electronic device of claim 10, wherein the converting is performed by an ink data manager.

19. One or more computer storage devices having computer-executable instructions that, upon execution by a processor, cause the processor to at least:
    detect a proximity of a pen to the electronic device;
    based on the detected proximity, execute a pen-aware shell on a user interface at a portion of the user interface;
    collect pen input, by the pen-aware shell, on a portion of the user interface occupied by the pen-aware shell;
    convert the pen input into an ink data structure
    identify an application as a destination for the ink data structure; and
    share the converted pen input with the application.

20. The one or more computer storage devices of claim 19, wherein the identifying the application comprises identifying the application based on content of the pen input.

* * * * *